(12) United States Patent
Shu et al.

(10) Patent No.: US 10,564,859 B2
(45) Date of Patent: Feb. 18, 2020

(54) COMPOSITE SOLID STATE DRIVE IDENTIFICATION AND OPTIMIZATION TECHNOLOGIES

(71) Applicant: Microsoft Technology Licensing, LLC, Redmond, WA (US)

(72) Inventors: Frank J. Shu, Bellevue, WA (US); Nathan S. Obr, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/910,919

(22) Filed: Mar. 2, 2018

(65) Prior Publication Data

US 2018/0188979 A1  Jul. 5, 2018

Related U.S. Application Data

(63) Continuation of application No. 15/406,885, filed on Jan. 16, 2017, now Pat. No. 9,940,038, which is a continuation of application No. 13/850,943, filed on Mar. 26, 2013, now Pat. No. 9,582,415, which is a continuation of application No. 12/035,425, filed on Feb. 21, 2008, now Pat. No. 8,429,677.

(60) Provisional application No. 60/912,726, filed on Apr. 19, 2007.

(51) Int. Cl.
*G06F 3/06* (2006.01)
*G06F 12/02* (2006.01)
*G06F 9/4401* (2018.01)

(52) U.S. Cl.
CPC ............ *G06F 3/0614* (2013.01); *G06F 3/061* (2013.01); *G06F 3/0632* (2013.01); *G06F 3/0679* (2013.01); *G06F 9/4401* (2013.01); *G06F 12/0246* (2013.01)

(58) Field of Classification Search
None
See application file for complete search history.

(56) References Cited

U.S. PATENT DOCUMENTS

| | | |
|---|---|---|
| 5,535,357 A | 7/1996 | Moran et al. |
| 6,016,402 A | 1/2000 | Thomas et al. |
| 6,032,224 A | 2/2000 | Blumenau |
| 6,069,827 A | 5/2000 | Sinclair |
| 6,173,385 B1 | 1/2001 | Tuma et al. |
| 6,467,022 B1 | 10/2002 | Buckland et al. |
| 6,574,588 B1 | 6/2003 | Shapiro et al. |
| 7,467,276 B1 * | 12/2008 | Kahn .................... G06F 3/0607 711/112 |

(Continued)

OTHER PUBLICATIONS

"Create Database Statement", Published in Adaptive Server IQ Reference Manual, Feb. 1, 2002, 9 Pages.

(Continued)

*Primary Examiner* — Craig C Dorais
(74) *Attorney, Agent, or Firm* — Mark K. Young; Mayer & Williams PC

(57) ABSTRACT

Technologies for an operating system identifying SSD and CSSD devices based on a corresponding descriptor, and for optimizing operating system functionalities with respect to the SSD/CSSD device. Optimizations include disabling non-SSD/CSSD functionalities, such as HDD defragmentation, and by enabling SSD/CSSD specific functionalities, such as write optimization storage functionalities.

17 Claims, 4 Drawing Sheets

(56) References Cited

U.S. PATENT DOCUMENTS

| | | | |
|---|---|---|---|
| 2001/0018728 A1 | 8/2001 | Topham et al. | |
| 2003/0046484 A1* | 3/2003 | Lasser | G06F 12/0246 711/103 |
| 2003/0200379 A1 | 10/2003 | Hollingsworth et al. | |
| 2004/0057297 A1 | 3/2004 | Jang et al. | |
| 2004/0103242 A1 | 5/2004 | Teng | |
| 2004/0153694 A1 | 8/2004 | Nicholson et al. | |
| 2004/0168014 A1 | 8/2004 | Lofgren et al. | |
| 2006/0149899 A1 | 7/2006 | Zimmer et al. | |
| 2006/0206904 A1 | 9/2006 | Watkins et al. | |
| 2006/0248259 A1 | 11/2006 | Ryu et al. | |
| 2007/0022416 A1 | 1/2007 | Masuda | |
| 2007/0079080 A1 | 4/2007 | Sanders et al. | |
| 2008/0168069 A1* | 7/2008 | Chang | G06F 3/0613 |
| 2009/0157934 A1 | 6/2009 | Kato et al. | |
| 2011/0099326 A1* | 4/2011 | Jung | G06F 12/0246 711/103 |

OTHER PUBLICATIONS

"E-Disk VME: 6U VME SCSI Wide Flash Disk", Published in BiTMICRO Networks, Inc, 1997, 3 Pages.

"Solid State Disks", Published in 86 Solid State Disks Articles on Storage Search, 1996, 14 Pages.

"Zeus Serial ATA (SATA) Solid State Drive", Published in Simple Tech, Inc., 2005, 48 Pages.

"Office Action Issued in Indian Patent Application No. 05642/CHENP/2009", dated Jul. 27, 2017, 7 Pages.

"Office Action Issued in European Patent Application No. 08733055.1", dated Nov. 23, 2012, 24 Pages.

"Office Action Issued in European Patent Application No. 08733055.1", dated Aug. 12, 2011, 4 Pages.

"Office Action Issued in European Patent Application No. 08733055.1", dated Jul. 18, 2012, 5 Pages.

"Provision of the Oral Proceedings Issued in European Patent Application No. 08733055.1", dated Nov. 23, 2012, 11 Pages.

"Supplementary Search Report Issued in European Patent Application No. 08733055.1", dated Mar. 4, 2011, 6 Pages.

"Final Office Action Issued in U.S. Appl. No. 12/035,425", dated Nov. 4, 2011, 29 Pages.

"Non Final Office Action Issued in U.S. Appl. No. 12/035,425", dated Jun. 27, 2011, 22 Pages.

"Final Office Action Issued in U.S. Appl. No. 13/850,943", dated Feb. 25, 2015, 15 pages.

"Final Office Action Issued in U.S. Appl. No. 13/850,943", dated Mar. 4, 2016, 16 Pages.

"Non Final Office Action Issued in U.S. Appl. No. 13/850,943", dated Aug. 26, 2015, 15 pages.

"Non Final Office Action Issued in U.S. Appl. No. 13/850,943", dated Oct. 24, 2014, 23 Pages.

"Office Action Issued in Chinese Patent Application No. 200880012531.5", dated Apr. 29, 2011, 8 Pages.

Padgett, W., "Formant an OS9 Disk", Retrieved from https://web.archive.org/web/20050427171120/http://www.desy.de/~cflt/info/Computers/os9_disks.html/, Feb. 1, 2001, 7 Pages.

"International Search Report and Written Opinion Issued in PCT Application No. PCT/US2008/59059", dated Aug. 8, 2008, 10 Pages.

* cited by examiner

COMPOSITE SOLID STATE DRIVE IDENTIFICATION AND OPTIMIZATION TECHNOLOGIES

RELATED APPLICATIONS

This application is a continuation of U.S. patent application Ser. No. 15/406,885 that was filed Jan. 16, 2017; which is a continuation of U.S. patent application Ser. No. 13/850,943 that was filed Mar. 26, 2013, now U.S. Pat. No. 9,582,415; which is a continuation of U.S. patent application Ser. No. 12/035,425 that was filed Feb. 21, 2008, now U.S. Pat. No. 8,429,677, that claims benefit and priority to U.S. Provisional Patent Application No. 60/912,726 that was filed Apr. 19, 2007, each of which is incorporated herein by reference in its entirety.

BACKGROUND

Solid state drives ("SSD") are becoming economical for use as bootable mass storage devices. SSDs are commonly fabricated to include flash memory devices, such as non-volatile flash memory devices including Not AND ("NAND") type devices. Composite SSDs ("CSSD") are typically fabricated with two or more performance classes of memory devices, high-speed memory devices (and thus higher cost) as well as lower-write-speed devices (and thus lower cost). Such composite SSDs tend to be less costly than SSDs fabricated solely of high-speed memory devices. Because write access on mass storage devices is often localized, composite SSDs are able to provide high-speed memory elements that can be leveraged for frequent write access combined with lower-write-speed memory elements for providing readable mass storage with less frequent write access. Since the introduction of SSD devices, manufactures have typically configured them to appear to a computing system as a conventional hard disk drive ("HDD"). But there tends to be significant performance differences between SSDs and HDDs. As many SSD devices are fabricated using flash memory, typical write operations have different considerations than do those of a conventional HDD that can over-write invalid (deleted) data with valid (new) data at the same physical location on the disk. SSD write operations typically require a write-merge operation so as to merge the new data with other existing data of the same memory block into a new memory block. Such merge operations typically involve a block erase operation that can be slow and reduce the life-span of the device. Thus, unnecessary write operations can contribute to reduced SSD performance and/or reliability.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for an operating system identifying SSD and CSSD devices based on a corresponding descriptor, and for optimizing operating system functionalities with respect to the SSD/CSSD device. Optimizations include disabling non-SSD/CSSD functionalities, such as HDD defragmentation, and enabling SSD/CSSD specific functionalities, such as write optimization storage functionalities. Further, these technologies may be applied to other forms of memory devices or storage devices or the like as well.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
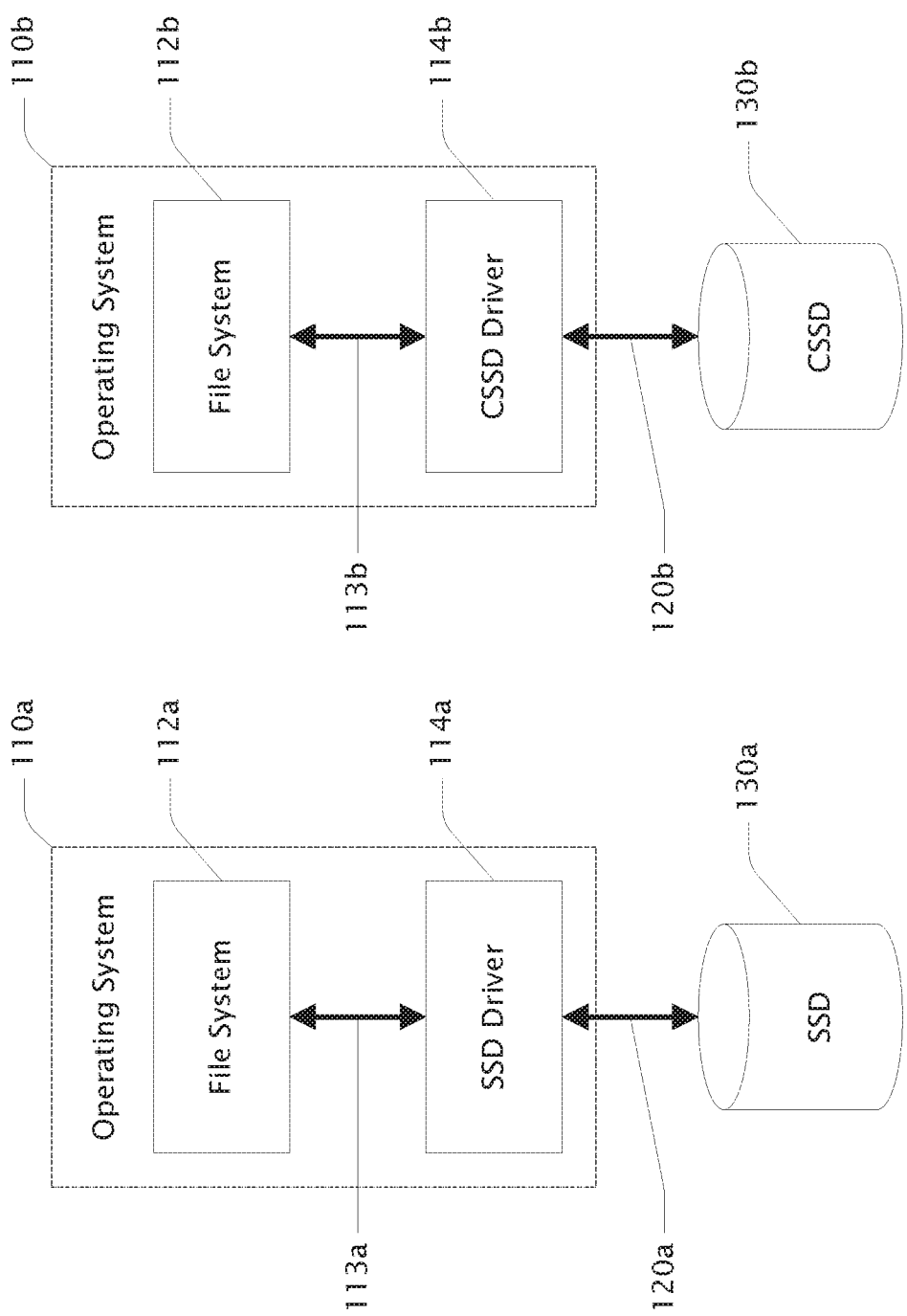
FIG. 1 is block diagram showing a conventional operating system and interface to a solid state drive, and an example new operating system and interface to the solid state drive.

FIG. 1 is block diagram showing a conventional operating system 110a and interface 120a to a solid state drive ("SSD") 130a, and an example new operating system 110b and interface 120b to a composite solid state drive ("CSSD") 130b. Conventional operating system 110a includes an example conventional file system 112a coupled to an example conventional SSD driver 114a via conventional interface 113a. One example of interface 113a is an input/output control ("IOCTL") interface. File system 112a typically manages the abstraction of data as files, folders, properties, and the like. These abstractions are typically transformed into physical data access and storage constructs by SSD driver 114a which interacts with SSD 130a via interface 120a to store and access data on SSD 130a. Examples of interface 120a include the advanced technology attachment ("ATA") and small computer system interface ("SCSI") interfaces.

Example SSD 130a is a solid state storage device fabricated using solid-state memory devices or the like as the storage medium, as opposed to magnetic or optical storage media such as with conventional HDDs, floppy disks, compact disks, or the like. These solid state memory devices may be flash memory, or any other type or combination of solid-state memory or the like. Such SSD devices may be boot devices and may be considered primary storage devices or mass storage devices such as those described in connection with FIG. 4. Descriptions herein of functionality of or action by an SSD device generally refer to the SSD device and/or a corresponding SSD driver. Of particular note is that SSD 130a identifies itself to operating system 110a as a conventional HDD, and operating system 110a recognizes and interacts with SSD 130a as a conventional HDD. Even so, SSD 130a may be a composite SSD as described in connection with FIG. 2.

Example new operating system 110b includes example new file system 112b coupled to example new composite SSD ("CSSD") driver 114b via example new interface 113b, which in turn is coupled to CSSD 130b via new example interface 120b. In general, the functionality of elements 110b, 112b, 113b, 114b, 120b, and 130b correspond to that of their similarly numbered 1xxa conventional counterparts, but new functionality is added for the present invention.

File system 112b utilizes new interface 113b to communicate with CSSD driver 114b to identify and retrieve CSSD description information from CSSD 130b via new interface 120b. Such CSSD description information typically enables operating system 110b to, among other things, recognize and interact with CSSD 130b as a CSSD device as opposed to a conventional HDD. Interface 113b generally corresponds in functionality to interface 113a, but is further operable to at least communicate CSSD description information. In one example, interface 113b conforms to an IOCTL interface with additional functionality for communicating CSSD description information. Interface 113b may conform to any format and/or structure suitable for coupling a file system and a CSSD driver sufficient to communicate CSSD description information.

Interface 120b generally corresponds to interface 120a, but is further operable to communicate CSSD description information. In one example, interface 120b conforms to an ATA interface with additional functionality for communicating CSSD description information. In yet another example, interface 120b conforms to a SCSI interface with additional functionality for communicating CSSD description information. Interface 120b may conform to any format and/or structure suitable for coupling a CSSD driver and a CSSD device sufficient to communicate CSSD description information.

Figure 2:
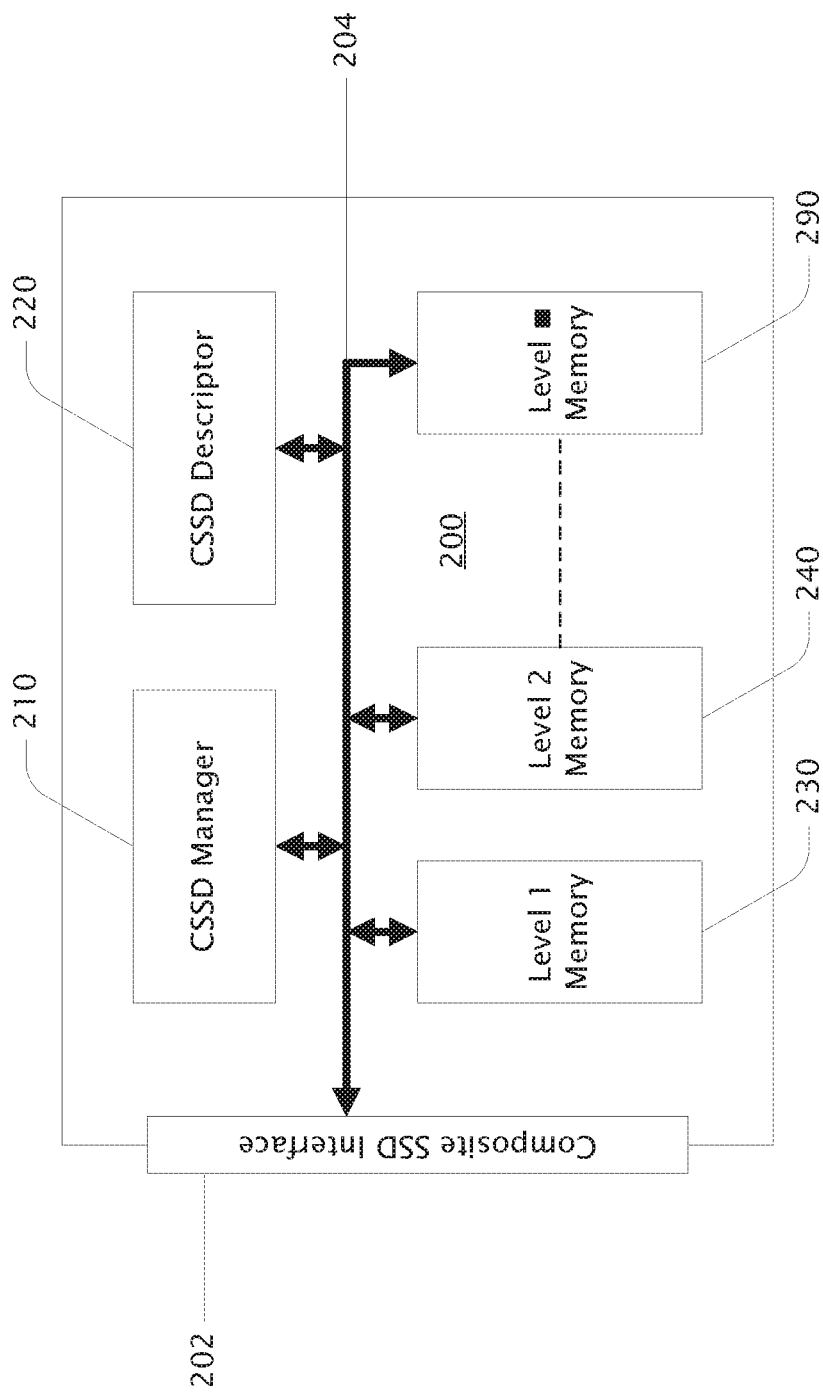
FIG. 2 is a block diagram showing the structure of an example composite solid-state drive.

FIG. 2 is a block diagram showing the structure of an example composite solid-state drive ("CSSD") 200. CSSD 200 is typically comprised of solid-state memory, such as memory 230, and 240 though 290, of differing performance classes, each performance class typically providing a different read and/or write access speed. With respect to CSSD devices, the primary performance consideration is typically speed of access, or memory speed. In one example, this memory is comprised of flash memory devices, such as nonvolatile flash memory devices including Not AND ("NAND") type devices and the like. In other examples, other types of flash memory may be used, such as Not OR ("NOR") type devices or the like. In yet other examples, any type of solid-state memory may be used, or any combination of device types. In yet further examples, magnetic media, optical media, tape media, or any type of memory device or storage device or the like may be used for one or more performance classes of memory of a CSSD resulting in a combination of solid state memory and magnetic media. I.e., memory 290 of CSSD 200 may be a HDD. In another example, a CSSD may be part of a computing environment, such as that described in connection with FIG. 4. For example, such a CSSD may be integrated with the motherboard of a computer system. Alternatively, a CSSD may be distinct from such an environment. For example, such a CSSD may be a portable device, plug-in device, wireless device, network appliance, or the like. Further, the term "CSSD" may refer to any type of composite memory device or composite storage device or the like, including non-solid state devices.

In a CSSD device, memory devices are typically classified by level. For example, level 1 memory 230 is typically the fastest or highest-speed memory (comprising one or more level 1 devices). Level 2 memory 240 is typically slower than level 1 memory 230, but faster than other levels of memory that may be included in the CSSD device. Level n memory 290 represents the slowest class of memory included in the CSSD device. In general, a CSSD device may be comprised of memory of two or more performance classes, with each class or level of memory being comprised of one or more physical memory devices. In one example, a CSSD includes two levels or performance classes of memory.

Memory 230 and 240-290 are typically coupled via CSSD bus 204 that further couples the memory to CSSD interface 202, and CSSD manager 210. CSSD interface 202 typically serves to couple CSSD 200 to a computing environment, such as computing environment 400 described in connection with FIG. 4. In one example, CSSD interface 202 corresponds to interface 120b of FIG. 1 and is operable to couple CSSD 200 to an operating system typically including a CSSD driver. Data to be stored in CSSD 200 and/or retrieved from CSSD 200 are typically communicated through CSSD interface 202 and over bus 204.

CSSD manager 210 is typically comprised of a processor or the like and sufficient processor-executable instructions to manage the operation of CSSD 200. In general, this includes placing the data with the highest rate of access or the like in level 1 memory 230 while placing data being accessed less in correspondingly lower levels of memory 240-290. This reallocation of data based on access rate is typically performed in a manner that is transparent to the system using CSSD 200. Further, CSSD 210 is operable to communicate CSSD descriptor 220 to an operating system or the like via CSSD interface 202. CSSD descriptor 220 provides description information of the CSSD that typically includes information identifying the performances classes of CSSD memory, the amounts of memory of each performance class, and the like. The format of and/or the description information in CSSD descriptor 220 may change over time as characteristics of the CSSD memory change, such as the percentage of available/used storage space, performance characteristics of the memory, and the like.

An example CSSD descriptor 220 is shown in table 1. This example may be structured for a conventional ATA interface. Similar descriptors may be structured for other interfaces, such as SCSI and the like.

TABLE 1

| WORD | BITS | DESCRIPTION |
|---|---|---|
| 0 | 5-15 | Reserved |
|  | 4 | 1 = Composite SSD |
|  | 1-3 | Reserved |
|  | 0 | 1 = SSD |
| 1 | 0-15 | SSD Level 1 memory size in MB (LSW) |
| 2 | 0-15 | SSD Level 1 memory size in MB (MSW) |
| 3 | 0-15 | SSD page size in bytes (LSW) |

TABLE 1-continued

| WORD | BITS | DESCRIPTION |
|---|---|---|
| 4 | 0-15 | SSD page size in bytes (MSW) |
| 5 | 0-15 | SSD block size in bytes (LSW) |
| 6 | 0-15 | SSD block size in bytes (MSW) |
| 7-32 | | Reserved |

Example CSSD descriptor 220 shown in Table 1 may also be used to describe a non-composite SSD device or other types of memory devices or storage devices or the like. Other formats and/or information may additionally or alternatively be provided. The example in Table 1 enumerates size information in megabytes ("MB") for one level of memory—SSD Level 1 memory. Additional levels of memory may be similarly described in additional fields not shown. Sizes are shown described in least-significant-word ("LSW") and most-significant-word ("MSW") format. CSSD descriptor 220 is typically maintained as a data structure stored in CSSD 200 in memory or some other form of computer-readable media.

Further example fields that may be used in example CSSD descriptor 200 are shown table 2.

TABLE 2

| WORD | BITS | DESCRIPTION |
|---|---|---|
| XXX | 0-15 | Optimal Write Size in KB (MSB) |
| XXX + 1 | 0-15 | Optimal Write Size in KB (LSB) |
| YYY | 0-15 | Optimal Read Size in KB (MSB) |
| YYY + 1 | 0-15 | Optimal Read Size in KB (LSB) |
| ZZZ | 0-15 | Optimal Allocation Size in KB (MSB) |
| ZZZ + 1 | 0-15 | Optimal Allocation Size in KB (LSB) |

Each example field shown in table 2 is a 32-bit value comprised of a 16-bit LSB portion and a 16-bit MSB portion. The example fields indicated a size in kilobytes ("KB"). Other formats and/or data sizes may alternatively be used. The example Optimal Write Size field comprises a value indicating the number of KBs for a write data transfer providing optimal write performance to the CSSD. The example Optimal Read Size field comprises a value indicating the number of KBs for a read data transfer providing optimal read performance from the CSSD. The example Optimal Allocation Size field comprises a value indicating the number of KBs providing optimal alignment for CSSD read and write performance.

Descriptor 220 is typically provided via interface 202 to an operating system or the like such that CSSD 200 can be identified by the operating system as an SSD and/or CSSD as opposed to a conventional HDD. Further, descriptor 220 provides the operating system with sufficient description information to determine the amounts of memory available for each memory performance level of CSSD 200 in addition to other CSSD characteristics. Such description information is usable by an operating system to optimize interactions with the CSSD and/or to optimize operations performed on the CSSD.

For example, and referring to Table 1, if bit 0 of word 0 is set to 1, then the device is an SSD device as opposed to an HDD or other device. In one example, if the device is an SSD device, then the operating system may disable HDD defragmentation for the device, and enable SSD defragmentation if it is available. Other non-SSD functionalities may similarly be disabled for the device, with other SSD-oriented functionality being enabled by the operating system.

If bit 4 of word 1 is set to 1, then the device is a composite SSD device. In one example, if the device is a CSSD, then the operating system may enable write optimized storage ("WOS") functionality designed to optimize write operations based on the performance characteristics of CSSD devices comprising a plurality of performance classes of memory. In such an example, the operating system can determine the size of the level 1 memory by reading word 1 and 2 of the descriptor shown in Table 1. This information can be used to optimize the WOS functionality. In a CSSD device with two levels of performance, the difference between the level 1 size and the total size typically indicates the size of the level 2 memory, thus negating the need to report it explicitly in the descriptor. Further, the operating system may utilize the page and block size data of the descriptor to further optimize SSD/CSSD operations, such as write and read operations and the like.

Figure 3:
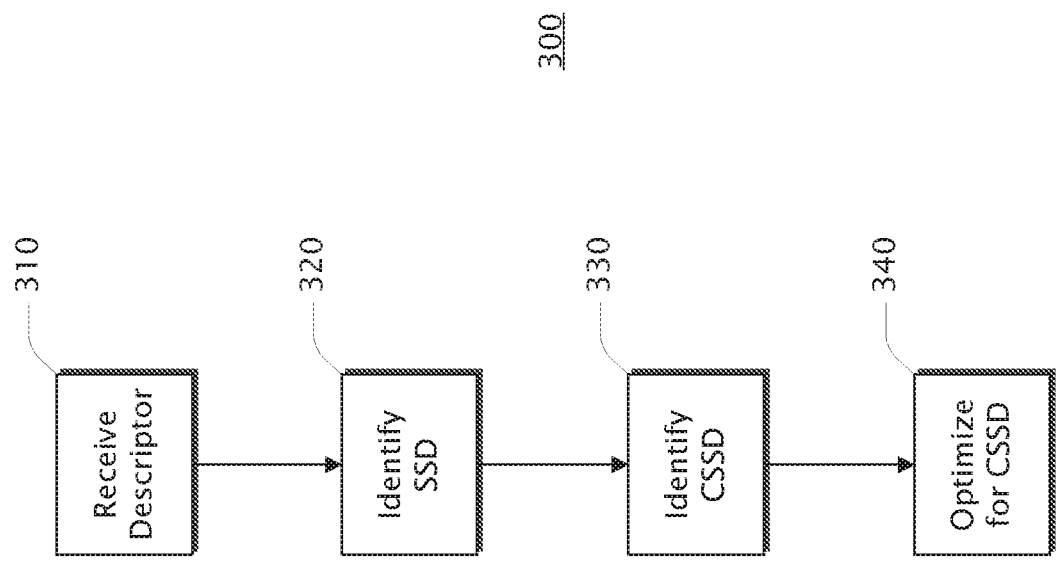
FIG. 3 is a block diagram showing an example method for identifying SSD/CSSD devices and optimizing operating system operations for such devices.

FIG. 3 is a block diagram showing an example method 300 for identifying SSD/CSSD devices and optimizing operating system operations for such devices. Method 300 is typically performed by an operating system in conjunction with an SSD/CSSD device. The operating system typically includes a file system and an SSD and/or CSSD driver; operations attributed to the operating system herein below may be performed by the file system, the SSD/CSSD driver, and/or other elements of the operating system. Block 310 indicates the operating system receiving a descriptor from a SSD/CSSD device, the descriptor including descriptive information describing the device such as that described in connection with Table 1 herein above and in connection with descriptor 220 described in connection with FIG. 2. Once the descriptor is received, method 300 typically continues with block 320.

Block 320 indicates the operating system reading the descriptor and identifying the device corresponding to the descriptor as an SSD device. In one example, the device is identified as an SSD device by finding a descriptor bit 0 of word 0 set to 1, such as in the descriptor described in Table 1. Once the device is identified as an SSD device, method 300 typically continues with block 330.

Block 330 indicates the operating system reading the descriptor and identifying the SSD device corresponding to the descriptor as a CSSD device. In one example, the SSD device is identified as a CSSD device by finding a descriptor bit 4 of word 0 set to 1, such as in the descriptor described in Table 1. Once the SSD device is identified as a CSSD device, method 300 typically continues with block 340.

Block 340 indicates the operating system optimizing interactions with and/or operations on the CSSD device based on the CSSD device characteristics. In one example, non-SSD/CSSD functionalities are disabled with respect to the CSSD device, such as HDD defragmentation. In another example, SSD/CSSD functionalities are enabled with respect to the CSSD device, such as WOS functionality.

Figure 4:
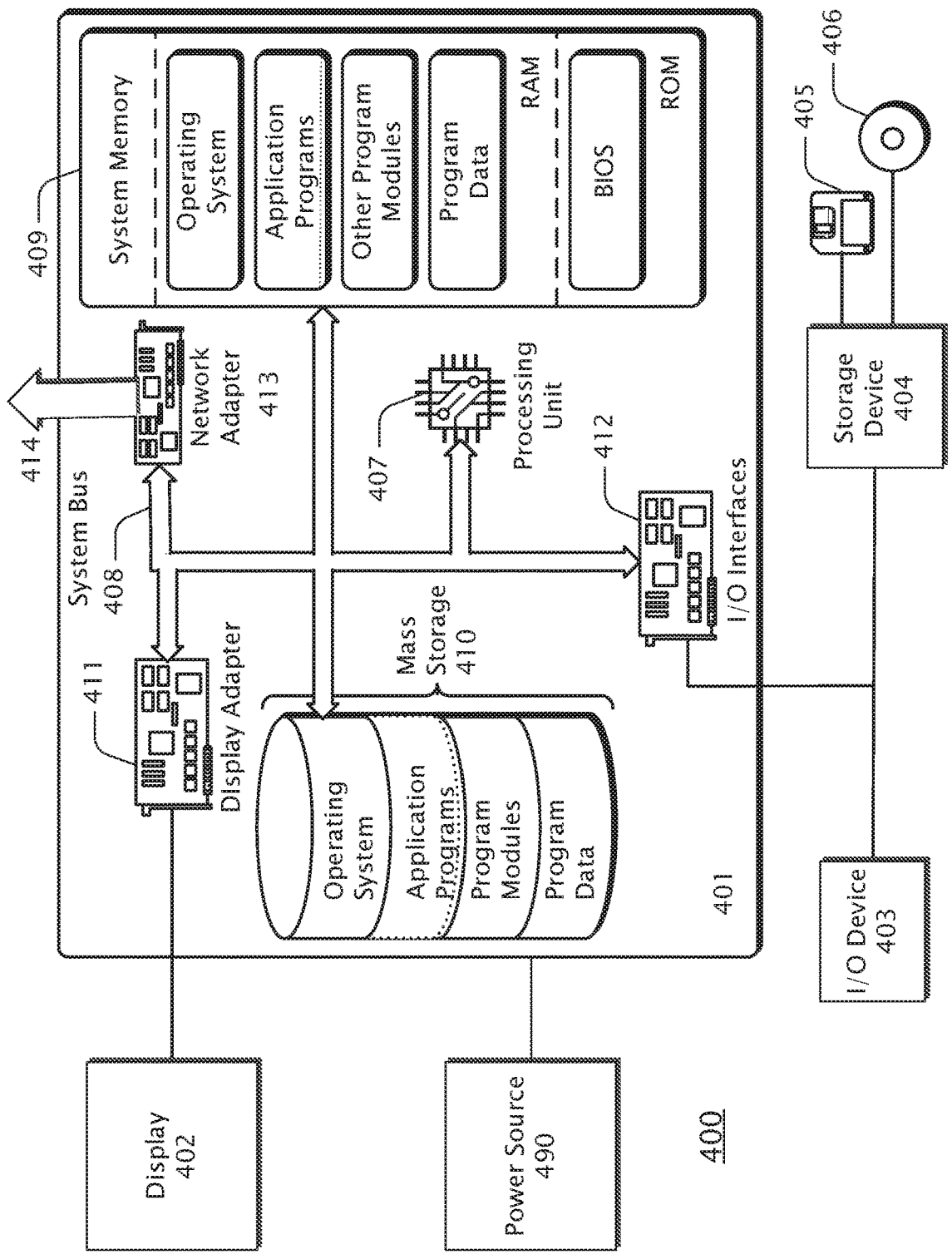
FIG. 4 is a block diagram showing an example computing environment in which the technologies described herein may be implemented.

FIG. 4 is a block diagram showing an example computing environment 400 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU—"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus or a storage bus or the like. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as a display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A computing device, comprising:
one or more processors;
an operating system supported on the computing device, and configured to control file system operations on the computing device using the one or more processors;
a storage device comprising a plurality of memories, including solid-state drive (SSD) memories and non-SSD memories in which the SSD and hard-disk drive (HDD) memories operate with different levels of performance; and
a bus that connects the one or more processors to the storage device,
wherein the computing device is configured to:
utilize one or more data structures to identify to the operating system characteristics about the plurality of memories to enable the operating system to perform optimizations on the storage device based on the performance levels, in which the one or more data structures facilitates the operating system's performance of the optimizations, and in which the computing device uses the identified SSD memories to thereby disable and enable functionalities of the operating system based on the identification.

2. The computing device of claim 1, in which the one or more data structures comprise a descriptor that provides descriptive information for ssd memories.

3. The computing device of claim 1, in which the computing device enables an operation for enhancing write operations for the SSD memories.

4. The computing device of claim 1, in which the operating system uses the one or more data structures to recognize the memory as comprising the SSD and HDD memories.

5. The computing device of claim 1, in which
the operating system uses the one or more data structures to recognize the memory as comprising the HDD memories and a composite solid-state drive (CSSD).

6. A storage device configured to communicate with a computing device that includes an operating system, comprising:
an interface that connects the storage device to the computing device; and
a data structure that identifies the storage device as including a solid-state drive (SSD) and non-SSD memory, each having different levels of performance,
wherein at least a portion of the SSD is configured for write-optimized storage by the operating system based on the data structure's identification of the SSD and non-SSD memory in the storage device, in which write-optimized storage includes read and write optimizations based on page and block size.

7. A storage device configured to communicate with a computing device that includes an operating system, comprising:
an interface that connects the storage device to the computing device; and
a data structure that identifies the storage device as including a solid-state drive (SSD) and non-SSD memory, each having different levels of performance,
wherein at least a portion of the SSD is configured for write-optimized storage by the operating system based on the data structure's identification of the SSD and non-SSD memory in the storage device, in which the operating system disables non-SSD type functionalities when performing storage device optimizations, in which the disabled non-SSD type functionalities include HDD defragmentation.

8. The storage device of claim 7, in which the disabled non-SSD type functionalities include write-optimized storage based on a plurality of performance classes of memory.

9. The storage device of claim 7, in which the data structure comprises a descriptor in a set of descriptors, each of the descriptors describing respective features associated with the SSD.

10. The storage device of claim 9, in which the features include one of a write-speed of the SSD, a read-speed of the SSD, or an amount of memory available at the SSD.

11. The storage device of claim 7, in which the interface that connects the storage device to the computing device is Advanced Technology Attachment (ATA).

12. The storage device of claim 7, in which the write-optimized storage includes SSD defragmentation.

13. At least one computer-readable storage media storing computer-executable instructions that, when executed by one or more processors in a computer, cause the computer to optimize an operating system for file system operations in a storage device, comprising:
establishing an interface for the one or more processors to communicate with memories in the storage device;
creating one or more data structures to identify a hard disk drive (HDD) and a solid-state drive (SSD) as memories in the storage device; and
enabling the operating system to utilize the one or more data structure to distribute the file system operations between the HDD and SSD.

14. The at least one computer-readable storage media of claim 13, in which the computer is further configured to enable predetermined file system operations when the one or more data structure indicates that the storage device is the SSD.

15. The at least one computer-readable storage media of claim 14, in which the one or more data structure identifies a write-speed of the SSD.

16. The at least one computer-readable storage media of claim 14, in which the one or more data structure identifies a read-speed of the SSD.

17. The at least one computer-readable storage media of claim 14 in which the one or more data structure identifies an amount of memory available at the SSD.

* * * * *